United States Patent
Hain et al.

(10) Patent No.: US 8,793,855 B2
(45) Date of Patent: Aug. 5, 2014

(54) METHOD OF USING A STUD MOUNTING MACHINE

(71) Applicant: Newfrey LLC, Newark, DE (US)

(72) Inventors: Jochen Hain, Giessen (DE); Alexander Schug, Giessen (DE); Karl Briel, Giessen (DE); Markus Feierabend, Giessen (DE); Michael Schneider, Giessen (DE); Frank Rosemann, Giessen (DE); Wolfgang Werner, Giessen (DE); Harald Knetsch, Giessen (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 14/027,671

(22) Filed: Sep. 16, 2013

(65) Prior Publication Data

US 2014/0079494 A1    Mar. 20, 2014

Related U.S. Application Data

(60) Division of application No. 12/986,616, filed on Jan. 7, 2011, now Pat. No. 8,533,922, and a continuation of application No. PCT/EP2009/003503, filed on May 16, 2009.

(30) Foreign Application Priority Data

Jul. 8, 2008  (DE) .......................... 10 2008 033371

(51) Int. Cl.
*B23Q 7/04* (2006.01)
*B23K 9/20* (2006.01)
*B65G 51/02* (2006.01)
*B23K 11/00* (2006.01)
*B23P 19/00* (2006.01)

(52) U.S. Cl.
CPC ................ *B65G 51/02* (2013.01); *B23K 9/201* (2013.01); *B23K 11/0053* (2013.01); *B23P 19/006* (2013.01); *B23K 9/206* (2013.01)
USPC ............ 29/283; 29/282; 29/281.5; 29/281.1; 29/243.56; 29/270; 29/278; 29/280; 81/53.2; 81/54; 81/55; 81/463; 81/464; 254/23

(58) Field of Classification Search
USPC ........ 29/282, 432, 281.5, 283, 281.1, 243.53, 29/243.56, 270, 278, 280; 254/18, 20, 23, 254/28; 81/53.2, 463, 464, 54, 55, 57.37
See application file for complete search history.

(56) References Cited

U.S. PATENT DOCUMENTS 2,735,649 A * 2/1956 Swallert ........................ 254/18
3,698,756 A * 10/1972 Groves ........................... 294/96
4,183,239 A * 1/1980 Stubbings ................... 29/811.2
4,728,217 A * 3/1988 Fink .............................. 403/290

(Continued)

*Primary Examiner* — Richard Chang
(74) *Attorney, Agent, or Firm* — Michael P. Leary

(57) ABSTRACT

A method of feeding a stud to a joining head including a stud shank clamp and operable to join the stud to a workpiece, and wherein the method of feeding the stud comprises the steps of providing a stud holding device including a securing sleeve and a plurality of collet arms; feeding the stud into the stud holding device to a first position wherein the flange is arranged above the free end of the plurality of arms and below the securing sleeve; and securing the stud in the first position by engaging the securing sleeve behind the flange.

3 Claims, 5 Drawing Sheets

(56) References Cited

U.S. PATENT DOCUMENTS

| | | | |
|---|---|---|---|
| 4,747,997 A * | 5/1988 | Boatwright | 376/261 |
| 5,213,311 A * | 5/1993 | Sabo | 254/24 |
| 6,357,110 B1 * | 3/2002 | Shipp et al. | 29/825 |
| 7,140,087 B1 * | 11/2006 | Giltner | 29/426.1 |

* cited by examiner

METHOD OF USING A STUD MOUNTING MACHINE

CROSS REFERENCE TO RELATED APPLICATIONS

This application is a divisional of U.S. patent application Ser. No. 12/986,616, filed Jan. 7, 2011 which is a continuation of PCT Application No. PCT/EP2009/003503, filed May 16, 2009 which claims the benefit of German Application No. 10 2008 033 371.9, filed on Jul. 8, 2008, the disclosure of which is incorporated herein by reference.

BACKGROUND OF THE INVENTION

The present invention relates to a holding device for studs which have a radially projecting flange section, comprising a collet component which has a clamping section and a hollow insertion section, it being possible for a stud to be inserted via the insertion section to the clamping section, and the clamping section being designed in order to exert a radially inwardly directed clamping force for clamping the stud in place, a securing device, past which a flange section of the stud can be directed, being arranged on the insertion section and being designed with respect to the clamping section in such a way that a flange section which is directed past the securing device is mounted in a secured manner in a securing position between the securing device and the clamping section.

Such a holding device is disclosed by document EP 1 495 828 B1.

The present invention also relates to a joining head for joining studs to workpieces, comprising such a holding device, and also relates to a method of feeding a stud to a joining head.

In the field of joining technology, it is known to join studs to the surface of a workpiece. This includes "stud welding", in which a stud is welded to the surface of a workpiece. Alternative joining techniques include, for example, the adhesive bonding of a stud to the surface of a workpiece.

Such processes are frequently carried out in an automated manner, for example in the motor vehicle industry, where a multiplicity of such studs are joined to the vehicle sheet in order to provide anchors for fastening means, paneling, etc. The automated joining of studs to workpieces as a rule includes the provision of a joining head on a robot. The joining head is in this case connected to a supply unit which provides, for example, the electric welding current and other control signals. Furthermore, it is preferred to feed the studs to the joining head in an automated manner. As a rule, this is effected by compressed air through feed tubes. For high cycle times, it is appropriate in this case to feed the studs from the rear, as it were, into a holding device of the joining head. The holding device serves to shift the stud into a defined ready position, starting from which a joining process can be initiated.

The diameter of the feed passages is as a rule slightly larger than the diameter of the flange section in order to make it possible to transport the stud therein with an easy motion. In the holding device, too, the inside diameter of the insertion section is as a rule slightly larger than the outside diameter of the flange section. This may result in a stud fed to the holding device coming into an oblique position in the holding direction and first having to be oriented (centered) again with a welding axis before the stud can be transferred into the ready position. In some situations, it may be the case that this centering does not succeed, the result of which is that the fed stud then has to be ejected from the holding device. In the process, the stud falls downward in an uncontrolled manner, either onto the floor or also, for example in automobile construction, into the body. The ejected studs then lie distributed on the floor and are swept up and thrown away. Studs left lying in a body may subsequently lead to disturbing noises during driving.

The holding device which has been disclosed by document EP 1 495 828 B1 has a securing device in the form of a collet element arranged inside a collet cover. The collet element has a plurality of axially extending arms which can be expanded radially relative to one another.

BRIEF SUMMARY OF THE INVENTION

The object of the present invention is to specify an improved holding device, an improved joining head and an improved feed method, the reliability of the feeding in particular being increased.

This object is achieved in the holding device mentioned at the beginning in that the securing device has at least two securing-sleeve sections which are movable radially relative to one another and which are designed as separate components and together form a securing sleeve.

Due to the securing device being formed by two securing-sleeve sections which are movable radially relative to one another and which are designed as separate components, the securing device can be produced in a simple manner from the structural point of view and fitted in the holding device. In addition, the reliability of the feeding of the stud can be increased. Furthermore, the securing device is more flexible, since the force which is required for passing the flange section through the securing device into the securing position can be lower or can be established so as to be adapted to the respective stud type. In addition, the securing device can be made in a cost-effective manner, for example of steel. Due to the securing device, which is preferably arranged in the interior of the collet component, wear of the collet component can also be reduced.

The expression "secure mounting" of the flange section is intended in this case to mean that the stud cannot fall back through the insertion section (in particular if the holding device is held "overhead") and/or that the stud is secured against an extreme oblique position inside the holding device.

It is generally conceivable here that the flange section is held between the securing device and the insertion section in such a secured manner that the stud is already centered in the holding device in the securing position. In this case, it may be sufficient, for example, to press the stud in the axial direction with its flange section into the clamping section. Alternatively, the securing position can also be formed in such a way that the stud, the flange section of which is arranged between the securing device and the clamping section, is already held in the correct position in the holding device, such that a subsequent process (such as a stud welding process) can be initiated (the securing position is then the ready position).

However, it is preferred if a centering device is assigned to the holding device, which centering device can be inserted from above into the insertion section and into the securing device and is designed in order to orient or center or take hold of a shank section of the stud. In this embodiment, the stud, in the securing position, need not be oriented completely with the joining axis, and therefore the holding device can be designed with comparatively large tolerances. However, the securing device prevents the stud in the holding device from passing into an extreme oblique position in which the centering device is also not able to orient the shank section of the stud. In this case, too, without the securing device according to the invention, the stud would have to be ejected.

However, the provision of the securing device can ensure that the centering device can always readily take hold of the stud and consequently orient or center it. A situation in which studs are needlessly ejected can therefore be avoided. Consequently no disturbing noises occur, for example, in a vehicle body. Contamination in the production cell is also avoided. A cost saving is also obtained, since ejected studs generally have to be discarded (risk of damage).

In addition, it is possible with the holding device according to the invention to reliably feed what are referred to as large-flange studs having a comparatively short shank.

Further and according to the invention, the above objective at the initially mentioned holding device is solved according to a second aspect in that the securing device has a plurality of radially elastic support elements distributed about a perimeter of the collet component.

By providing radially elastic support elements distributed about a perimeter of the collet component, substantially the same effect as by the two securing-sleeve sections which are movable radially relative to one another is achieved. When introducing a stud, the support elements are pushed outwards by the flange section so that the flange section of the stud can pass by the support elements. Afterwards, the support elements move back into their original position. Now, the flange section cannot pass by the support elements in an opposite direction any more. Thereby, the elasticity of the support elements has to be chosen correspondingly so that for example the weight of a stud during "overhead"-working is not sufficient to push the support elements apart.

For example, wire elements which are guided through the longitudinal slots between single arms of the collet component can be provided as support elements. The wire elements can be bent so that bend sections project into the collet component in the initial position and prevent the shaft of the stud completely abutting the collet component. In this alternative manner, a secure mounting in the meaning of the invention is also achieved.

Furthermore, the object is achieved according to the invention by a method of feeding a stud to a joining head which serves to join a stud to a workpiece, the stud having a radially projecting flange section, comprising the steps: feeding the stud into a holding device of the joining head until the flange section is arranged in front of a clamping section of the holding device, and securing the stud in this position by a securing device engaging behind the flange section, which securing device has at least two securing-sleeve sections which are movable radially relative to one another and which are designed as separate components and together form a securing sleeve.

Finally, the above object is achieved by a joining head for joining studs to workpieces, comprising a holding device according to the invention and comprising a shank-clamping device which can be inserted into the holding device and is designed in order to accommodate the shank section of a stud in the securing position, the shank-clamping device being designed in order to shift the stud from the securing position into a ready position.

The object is therefore completely achieved.

The securing device of the holding device according to the invention can generally be arranged outside the insertion section and can extend with a lug or the like into the interior of the insertion section in order to establish the securing position.

However, it is especially advantageous if the securing device is arranged inside the insertion section.

This results in a simple and compact construction.

According to a further preferred embodiment, the securing sleeve is designed in such a way that the flange section can be passed through the securing sleeve.

In this embodiment, the securing sleeve preferably directly adjoins a feed passage of the joining head, such that a smooth transition can be ensured.

In this case, it is especially advantageous if the securing sleeve has a securing section which is arranged adjacent to the clamping section, the securing section being designed to be radially expandable in such a way that the flange section, in the securing position, is held between the at least not completely expanded securing section and the clamping section in a secured manner.

As a result, the stud is secured in the securing position by the securing section engaging behind the flange section when it is not completely expanded.

In this case, it is preferred that the radial force exerted on the flange section by the clamping section be greater, to be precise in particular markedly greater, than the radial force which is exerted on the flange section by the expandable securing section.

It is generally conceivable for the securing section, on account of structural boundary conditions, to automatically or inevitably fall back behind the flange section after it has been expanded. However, it is especially preferred if the securing section is compressed into the non-expanded position by elastic means. The elastic means are in this case preferably designed in such a way that only a very low force is exerted on the flange section when the latter travels through the securing device. This can ensure that the stud can also be reliably inserted into the securing position by conventional means, such as by compressed air for example.

Consequently, the securing-sleeve sections, in the region of their ends adjacent to the clamping section, are preferably prestressed toward one another in the radial direction by means of a prestressing device.

The prestressing device can be formed, for example, from an O-ring made of heat-resistant material or also from a spring washer made of metal.

The flange section is generally preferably surrounded by the securing sleeve when passing through the securing device, such that a situation can be avoided in which the flange section (which can be of polygonal design for example) catches on contours of the securing device.

In this case, it is especially advantageous if the securing-sleeve sections have, in the region of their end opposite the clamping section, a collar section which is movably mounted on a housing section in such a way that the securing-sleeve sections can be expanded relative to one another in the radial direction at least in the region of their securing ends adjacent to the clamping section.

In this embodiment, the securing device can be constructed in a very simple manner, in the ideal case only by the two securing-sleeve sections which are mounted such as to be movable inside the holding device, to be more precise such as to be movable inside the insertion section.

In this case, it is especially preferred if the securing-sleeve sections can be pivoted relative to one another about a tilting axis which is oriented transversely to the insertion direction and which is arranged between the collar section and the securing ends.

In this embodiment, the securing sleeve preferably has its smallest inside diameter, adapted to the flange section, in the region of the tilting axis. Since this section having the smallest inside diameter is arranged in the region between the collar section and the securing ends, a prestressing device for radially prestressing the securing-sleeve sections can be dimensioned to be relatively small on account of the relatively short lever forces. It is consequently possible overall for the flange section to be passed through the securing sleeve with relatively low resistance, such that the reliability of the feeding is increased.

Furthermore, it is advantageous in this embodiment if the securing-sleeve sections, on their sides pointing toward one another, are tapered from the tilting axis toward the securing ends.

Consequently, the inside diameter which is formed by the securing-sleeve sections in the region of the securing ends is smaller than the inside diameter of the initial sleeve from which the tapered securing-sleeve sections have been produced.

This consequently makes it possible in a simple manner from the structural and production point of view for the securing ends to be able to engage behind the flange section, passed through the securing sleeve, in order to establish the securing position.

Consequently, when the securing sleeve is closed (when the securing ends bear against one another), a wedge space forms in the region from the tilting axis toward that end of the securing sleeve which faces the feed passage. This results in a relatively large insertion opening into the securing sleeve in the region of the feed passage, such that the reliability of the feeding can likewise be increased.

Furthermore, it is advantageous overall if the collet component has clamping arms, which form the clamping section, and stop arms, which are axially longer than the clamping arms.

The stop arms can prevent a stud that is shifted from the securing position into a ready position from falling out of the holding device on account of an insufficient build-up of clamping forces when the flange section is pushed past the clamping arms.

This applies in particular when the joining head has a shank-clamping device which can be inserted into the holding device and is designed in order to accommodate the shank section of a stud in the securing position. Here, the radial clamping force for holding the stud in the ready position is produced by a radial clamping force of the clamping arms from outside on the shank-clamping device. This force, when the flange section is pushed axially past the clamping arms, is still not sufficient in some cases in the prior art in order to securely hold the stud. In this case, the stop arms prevent the stud from falling out. The clamping arms then come to bear on the outside against the shank-clamping device and exert a radial force on the latter in order to clamp the stud in place. The flange section of the stud is then also pushed axially past the stop arms in order to shift the stud into the ready position.

Accordingly, it is especially advantageous in the feed method according to the invention if the stud is taken hold of and centered in the securing position by a clamping device before the clamping device is inserted into the clamping section in order to shift the stud into the ready position.

Alternatively, the collet element can be provided for having a slotted cylindrical front portion forming the clamping section.

In this alternative, the arms of the collet element consequently all have the same length and each arm has a clamping surface so that overall kind of a cylindrical clamping collet is formed. When pushing the stud through the slotted cylindrical front portion, the shank section of the stud is clamped in the clamping surface first and it is avoided that the stud falls out. Then, when the flange section is pushed past the clamping surfaces, the clamping surfaces abut the shank-clamping device and push the shank-clamping device to the shank of the component which is then placed in the ready position.

Due to the common length layout of the arms, the clamping device can be manufactured more economically. Further, the clamping surfaces having the same length and abutting about the whole perimeter avoid that melt enters the interior of the clamping device through the gaps between the ends of the arms during a welding process.

It goes without saying that the abovementioned features and the features still to be explained below can be used not only in the respectively specified combination but rather also in other combinations or on their own without departing from the scope of the present invention.

BRIEF DESCRIPTION OF THE SEVERAL VIEWS OF THE DRAWING

Exemplary embodiments of the invention are shown in the drawing and are described in more detail below. In the drawing.

DETAILED DESCRIPTION OF THE PREFERRED EMBODIMENTS

Figure 5:
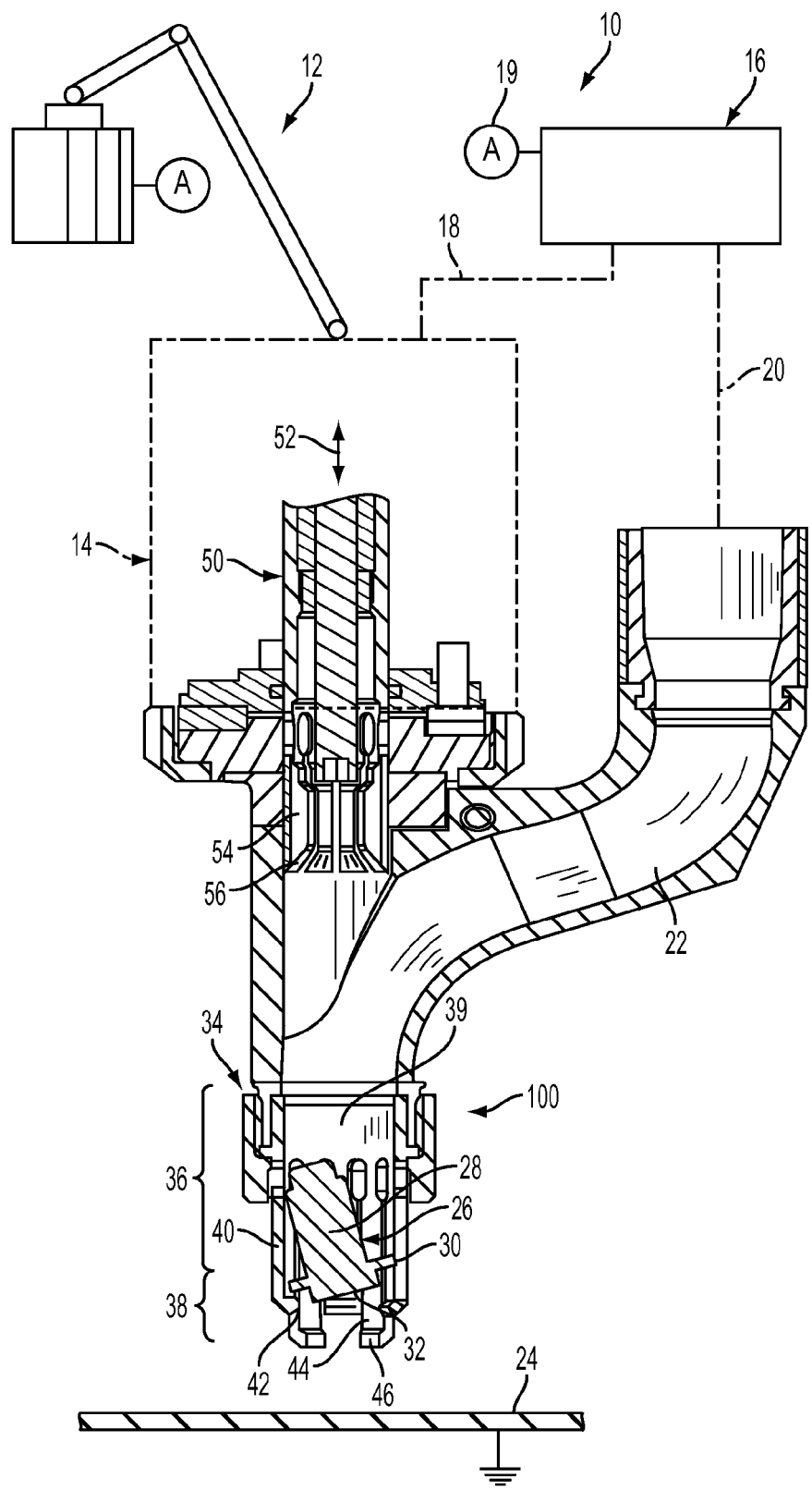
FIG. 5 shows a welding system with a welding head.

A joining system in the form of a stud welding system is designated generally by 10 in FIG. 5. The welding system 10 contains a robot 12, which can be designed, for example, as a robot having multi-jointed arms. A welding head 14 is secured to the end of a processing arm of the robot 12. The welding head 14 is connected via an electrical supply 18 and via a stud feed 20 to a supply unit 16. The supply unit 16 typically contains power electronics for providing a welding current, which is fed to the welding head 14. Furthermore, the supply unit 16 typically contains a control device, by means of which the robot 12 can also be activated, to be precise via a robot control 19. Furthermore, the supply unit 16 contains a stud supply, from which studs are fed separately to the stud feed 20.

The welding head 14 contains a feed passage 22 which is connected to the stud feed 20 and via which a respective stud 26 can be directed into the welding head 14. The stud 26 fed to the welding head 14 is to be welded to a workpiece 24, for example a metal sheet, by means of the welding system 10. In the present case, the welding system 10 is designed as a stud welding system which can work, for example, according to the drawn arc method. In this method, the stud 26 is first of all set down on the workpiece 24 by means of the welding head 14. A "pilot current" is then directed through the stud 26 and the workpiece 24. After that, the stud 26 is lifted slightly from the workpiece, in the course of which an arc is struck. The current is then increased to a welding current, in the course of which those surfaces of the stud 26 and of the workpiece 24 which are opposite one another are fused. Finally, the stud 26 is lowered onto the workpiece 24 again and the welding current is switched off. The connected molten pools of stud 26 and workpiece 24 solidify, such that the stud 26 is finally fixedly connected to the workpiece 24. Such stud welding systems are widely used in the motor vehicle industry.

Alternatively, however, the joining system 10 may also be designed to adhesively bond or braze the stud 26 to the workpiece 24.

The stud 26 has a shank section 28, which can be provided, for example, with an external thread. Furthermore, the stud 26 has a flange section 30 which projects radially relative to the shank section 28 and which may be of polygonal design, for example, at its outer circumference. Finally, the stud 26 has a welding section 32 which is to be connected to the workpiece 24.

The joining head 14 contains a holding device 100 for the stud 26, this holding device 100 serving to shift the stud fed via the feed passage 22 into a ready position, in which the stud 26 has a defined position with respect to the joining head 14 and which the stud 26 assumes before the joining process described above is initiated.

The holding device 100 contains a housing section 34 which is rigidly connected to the joining head 14. Furthermore, the holding device 100 contains an insertion section 36 which is designed as a hollow section and is connected to one end of the feed passage 22. The holding device 100 also contains a clamping section 38 which is designed to clamp the stud 26 frictionally in the ready position (by inwardly acting radial forces). The insertion section 36 and the clamping section 38 are in this case formed by an individual collet component 39 which has an annular section (not designated in any more detail) in the top region of the insertion section 36. The annular section is connected to the feed passage 22. Extending from the opposite end of the annular section are a plurality of circumferentially distributed clamping arms 40, on the end of which respective clamping lugs 42 are formed, said clamping lugs 42 extending from the clamping arms 40 radially inward at an angle.

Furthermore, a plurality of stop arms 44 extend from the annular section. The stop arms 44 are generally longer than the clamping arms 40 and are provided at their ends with stop lugs 46 which are directed radially inward. The stop arms 44 and the clamping arms 40 are arranged alternately, for example, over the circumference of the holding device. The stop arms 44 not only perform the function of a limit stop, as described below, but also a clamping function. The stop arms 44 therefore also form second clamping arms.

Figure 3:
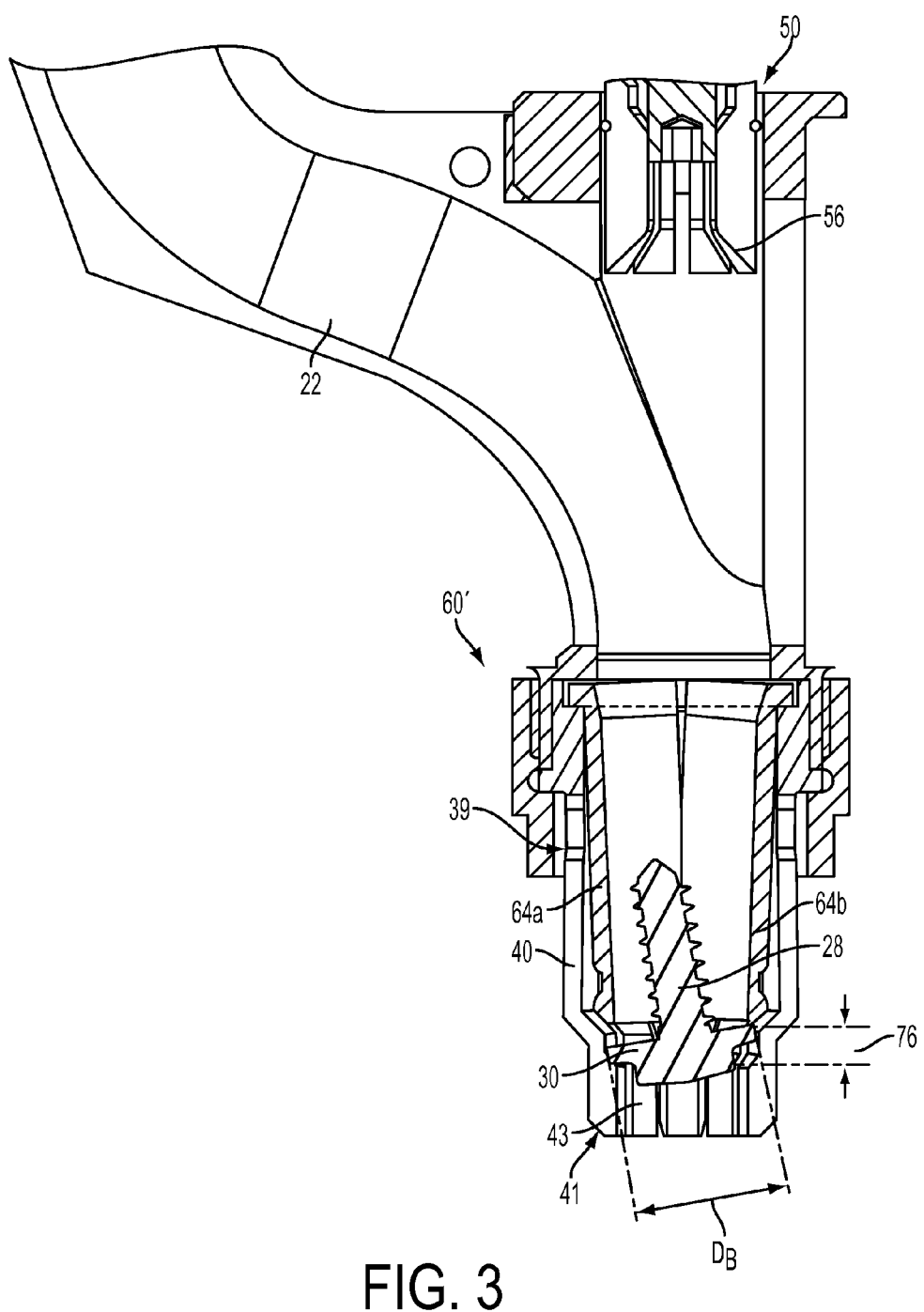
FIG. 3 shows a cross-sectional view of a holding device according to a second embodiment of the present invention.

The clamping arms 40 and the stop arms 44 can be elastically expanded in the radial direction. The inside diameter defined by the clamping lugs 42 or the stop lugs 46 is in each case smaller than the outside diameter of the flange section 30. A stud 26 fed into the holding device 100 is shown in FIG. 3, which stud 26 has been fed from above via the stud feed 20 and the feed passage 22 through the insertion section 36. The stud 26 in this case is shown in a marked oblique position, which generally cannot be avoided with this type of holding device. This is due to the fact that the flange section 30 inside the insertion section 36 comes into contact with the inner side of the clamping arms 40 or of the stop arms 44. The fact that the outer circumference of the flange section 30 is often of polygonal design and/or the fact that longitudinal grooves are formed between the arms 40, 44 can result in such an oblique position.

Furthermore, a shank-clamping device 50, which is formed on the joining head 14 such as to be movable in the axial direction, as shown at 52, is assigned to the holding device. The shank-clamping device 50 has a shank-locating section 54 which contains a plurality of radially expandable arms extending in the axial direction. Furthermore, the shank-clamping device 50 has a centering section 56. The centering section 56 is formed on the ends of the arms of the shank-locating section 54, the arms in the region of the centering section running obliquely outward, such that they jointly form an insertion cone.

To shift the stud 26 into a ready position, the shank-clamping device 50 is moved downward (the specification "downward" relates to the illustration in FIG. 1 but should not be understood as being restrictive), to be precise into the holding device 100. In the process, the centering section 56 takes hold of the top end of the shank section 28 and sets the stud 26 upright, the shank section 28 being inserted into the shank-locating section 54 until a top end of the shank section 28 strikes a limit stop of the shank-clamping device 50. In the process, the stud 26 is supported on the clamping lugs 42.

The shank-clamping device 50 is then moved further downward, the flange section 30 first of all being pushed past the clamping lugs 42. In the process, the clamping arms 40 expand radially outward. The stop lugs 46 of the stop arms 44 prevent the stud 26 from subsequently falling out of the holding device 100 by virtue of the fact that the stop lugs 46 act on the underside of the flange section 30. Proceeding therefrom, the shank-clamping device 50 is moved further downward, the clamping lugs 42 acting on the outer circumference of the shank-clamping device 50 and thereby clamping the stud 26 fixedly in the shank-clamping device 50.

The shank-clamping device 50 is then moved still further downward until the flange section 30 is also pushed past the stop lugs 46. A ready position is reached when the flange section 30 lies slightly below the bottom end of the stop lugs 46. A radial force continues to be exerted on the shank-clamping device 50 in this state by the clamping arms 40 and the stop arms 44, such that the stud 26 is held or clamped frictionally in this position in the holding device 100. Proceeding therefrom, the joining process described above can be initiated. When the stud 26 is rigidly joined to the workpiece 24, the joining head 14 is retracted (in which case the shank-clamping device 50 can first of all be moved back inside the joining head 14). As a result, the stud 26 is released from the holding device 100. A further stud 26 can then be fed via the feed passage 22 and a further joining process can be initiated.

The stud feed can be realized in a largely reliable manner by the double clamping system set up in this way. Nonetheless, a situation may occur in which the stud 26 is in such an oblique position or is jammed in such a way in the holding device 100 that the centering section 56 can also no longer orient the stud 26. In this case, the stud 26 is ejected downward via the holding device 100, a factor which leads to the problems mentioned at the beginning.

Figure 1:
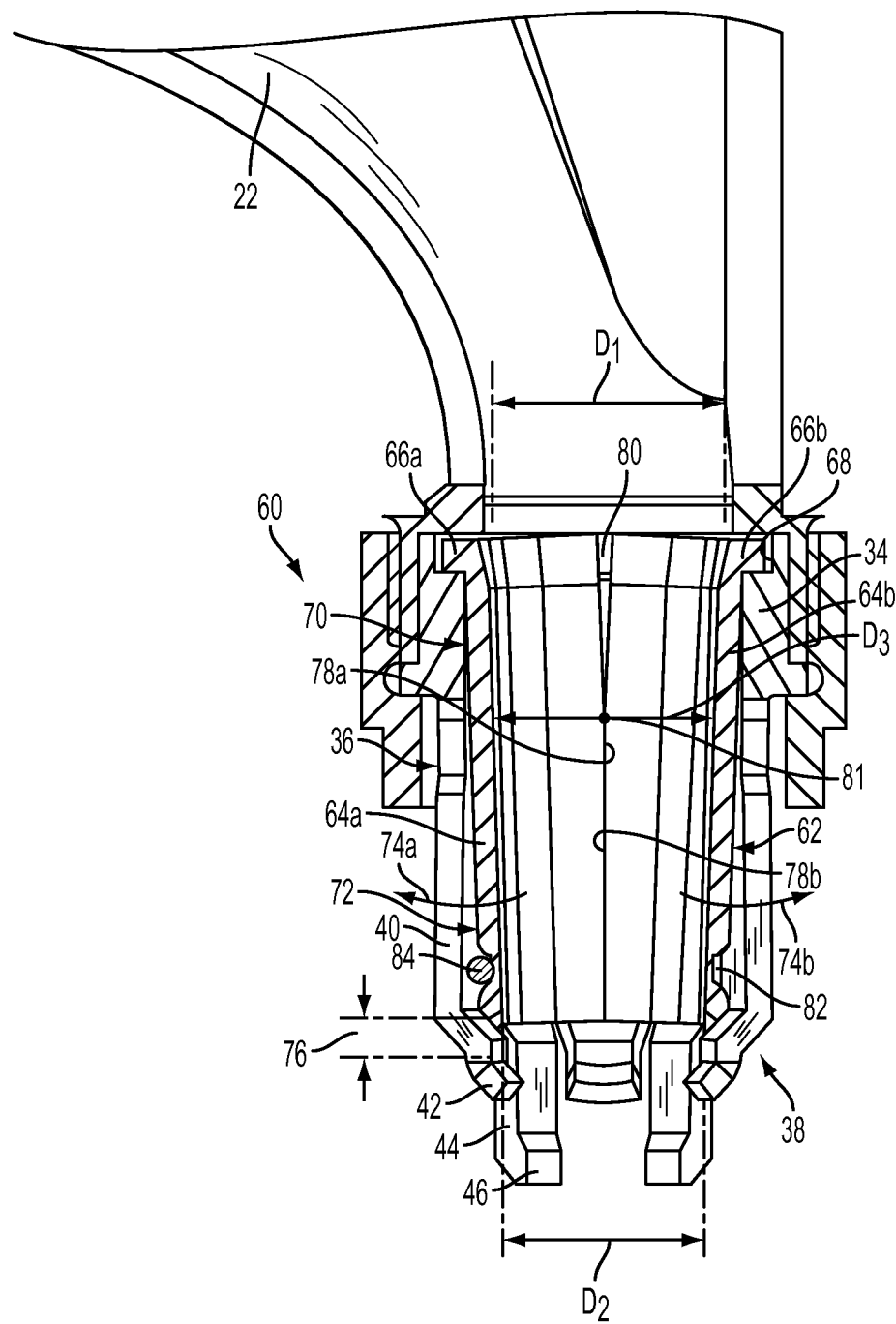
FIG. 1 shows a cross-sectional view of a holding device according to an embodiment of the present invention.
Figure 2:
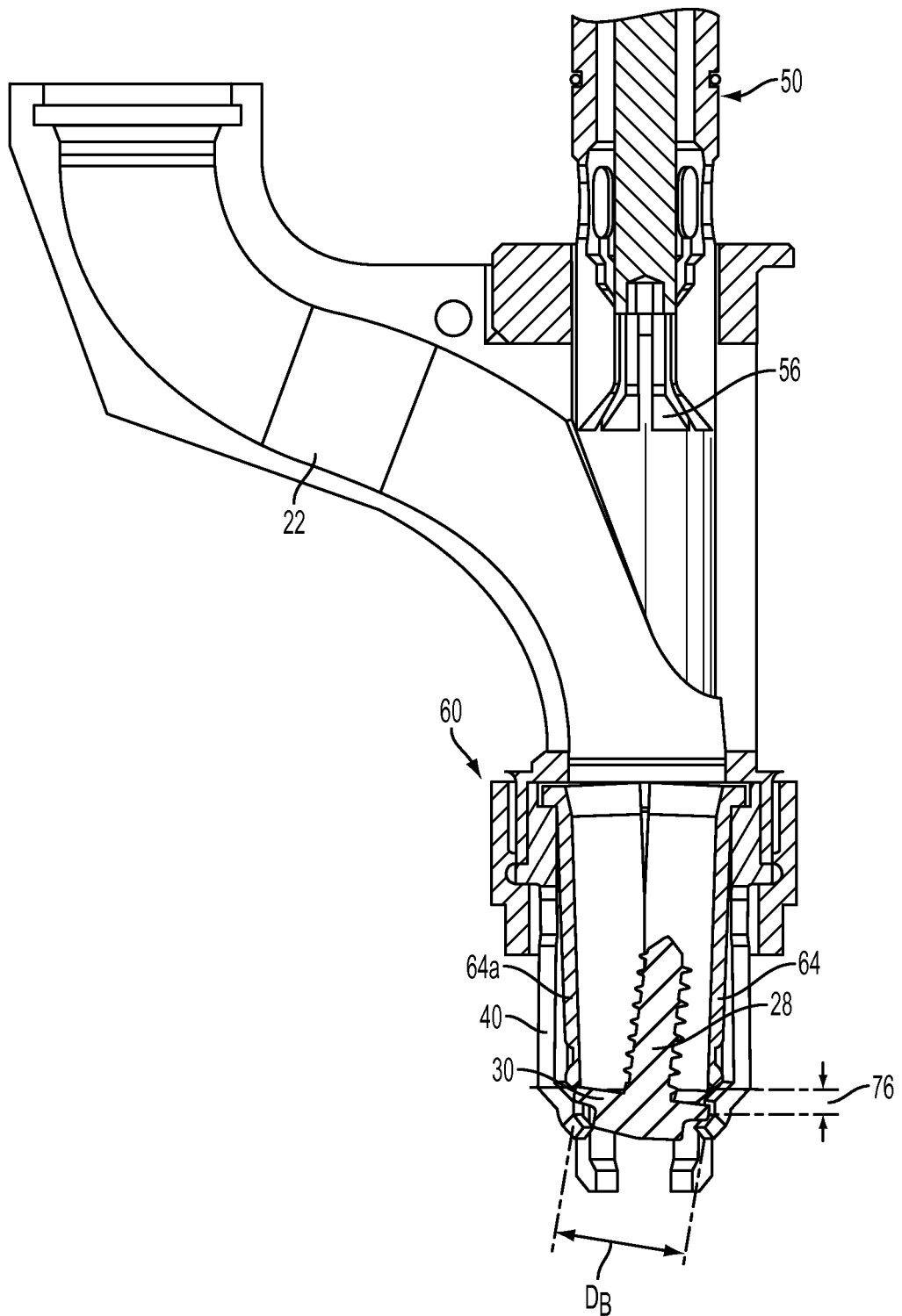
FIG. 2 shows part of a joining head with the holding device of FIG. 1.

An improved embodiment of a holding device according to the invention or of a joining head is shown in FIGS. 1 and 2, with which embodiment these problems can be further reduced.

With regard to construction and functioning, the holding device shown in FIGS. 1 and 2 generally corresponds to the holding device of FIG. 5. The same elements are therefore designated by the same designations. Only the differences are dealt with below. Furthermore, the joining head 14 on which the holding device 60 of FIGS. 1 and 2 is to be used corresponds to the joining head 14 of FIG. 5. The general method sequence during the feeding and readying of studs and the subsequent joining sequence are otherwise identical, insofar as nothing else is mentioned.

The holding device 60 shown in FIGS. 1 and 2 is generally constructed like the holding device 100, namely with an insertion section 36 and a clamping section 38. However, the holding device 60 additionally has a securing device 62 which prevents a stud 26 fed into the holding device 60 from becoming jammed therein or from assuming such an oblique position that it can no longer be set upright by the centering section 56. Furthermore, the securing device 62 can alternatively or additionally prevent a stud 26 fed into the holding device 60 from falling back against the feed direction (which could be the case, for example, if a stud 26 is to be joined to a workpiece 24 against the force of gravity, for example "overhead").

The securing device 62 is formed in the interior of the holding device 60. For this purpose, the inside diameter of the clamping arms 40 and of the stop arms 44 is greater than a diameter $D_1$ of the feed passage 22. The securing device 62 is formed by a plurality of securing-sleeve sections 64 (in the present case two securing-sleeve sections 64a, 64b) which together roughly define a sleeve shape and are arranged inside the insertion section 36 concentrically thereto.

At their top end, the securing-sleeve sections 64 have a respective circumferential section 66a, 66b which is accommodated in an inner circumferential groove 68 of the housing section 34. The collar section 66 is in this case movably accommodated inside the groove 68.

The securing-sleeve sections 64 have a respective bearing section 70 which faces the feed passage 22 and contains the collar section 66. Furthermore, the securing-sleeve sections 64 have a respective securing section 72 which faces the clamping section 38.

The securing-sleeve sections 64a, 64b define an inner passage, which in the region of the bearing section 70 has a diameter which corresponds approximately to the diameter $D_1$ of the feed passage 22. At a bottom end of the securing section 72, the inner passage has a diameter $D_2$ which is smaller than the diameter $D_1$ and smaller than the outside diameter $D_B$, shown in FIG. 2, of the stud 26. In particular on account of the movable mounting of the collar section 66, the securing sections 72 of the securing-sleeve sections 64 can be expanded radially, as shown at 74a and 74b, respectively. Consequently, a stud fed via the feed passage 22 can be directed with its flange section 30 through the securing device 62. The securing sections 72 expand in the process. Finally, the flange section 30 passes into a position above the clamping lugs 42 of the clamping arms 40. As soon as the securing sections 72 fall back again into the position shown in FIG. 1, the bottom ends of the securing sections 72 engage behind the flange section, as shown in FIG. 2. In this case, a clearance space 76 between a bottom end of the securing sections 72 and a top end of the clamping lugs 42 is selected in such a way that the stud 26 can no longer assume any extreme oblique position. Furthermore, the stud 26 is prevented from being able to fall back again in the direction of the feed passage 22. Consequently, at most an oblique position as shown in FIG. 2 may arise. In this position, the shank section 28 is generally at a distance from the inner circumference of the securing device 62, such that the shank-clamping device 50 can take hold of the shank section 28 without any problems (via its centering section 56).

Although the securing device 62 in the present case is formed by two securing-sleeve sections 64 in the interior of the holding device 60, it goes without saying that such a securing device can also be arranged outside the holding device 60 and can project, for example, via apertures in the holding device at a suitable point into the inner circumference of the holding device 60. It is also generally conceivable for the securing device 62 to be formed by elastically deformable means at the inner circumference of the holding device 60. In any case, the securing device 62 is designed to hold the flange section 30 between the clamping section 38 and the securing device 62 in such a secured manner that the stud 26 does not assume an extreme oblique position and cannot fall back into the feed passage 22.

In the present case, the securing-sleeve sections 64 are formed from two halves of a cylindrical sleeve which is formed with the collar section 66 at its top end. The two sleeves are tapered in the region of the securing section 72, as shown at 78a and 78b, respectively, in FIG. 1. The result of this is that, when these tapers 78 bear against one another, the securing-sleeve sections 64 in the region of the bearing section 70 than define a wedge space 80 between them. The line of the transition between the bearing section 70 and the securing section 72 then forms a type of tilting axis or pivot bearing 81 for the securing-sleeve sections 64.

At their bottom end facing the clamping section 38, the securing-sleeve sections 64 can be provided with an outer groove 82. Elastic pressure means 84, such as, for example, an O-ring made of heat-resistant material or a metallic spring washer, can be arranged in this outer groove 82. However, an O-ring is preferred, since it can exert a more uniform circumferential force on the securing-sleeve sections 64. Elastic pressure means may also be arranged, for example, between the groove 68 and the collar section.

However, it is generally also conceivable for the securing-sleeve sections 64 to also function without such elastic pressure means 84 by virtue of the fact that, depending on position, at least one of the securing-sleeve sections 64 falls back into the position shown in FIG. 1 after the flange section 30 has been passed through the securing device 62.

An alternative second embodiment of the holding device depicted in FIGS. 1 and 2 is shown FIG. 3 and, with regard to construction and functioning, generally corresponds to the holding device of FIGS. 1 and 2. The same elements are designated by the same designations. Only the differences are dealt with below. Furthermore, the joining head 14 on which the holding device 60 of FIG. 3 is to be used corresponds to the joining head 14 of FIG. 5. The general method sequence during the feeding and readying of studs and the subsequent joining sequence are otherwise identical, insofar as nothing else is mentioned.

In the holding device 60' shown in FIG. 3, no stop arms 44 are provided. Instead, clamping arms 40 are provided which all have the same length and form a cylindrical front portion 41 of the collet component 39. The collet component 39 has longitudinal slots in the known manner, to provide an elasticity in a radial direction to the clamping arms 40 and achieve the desired radially directed clamping effect. The insertion of the stud 26 takes place as already described in connection with the embodiment shown in FIGS. 1 and 2 until the stud 26 has reached the securing position with its flange section 30.

Subsequently, the shank section 28 of the stud 26 is picked by the shank-clamping device 50 and pushed through the slotted cylindrical front portion 41. At the same time, the shank-clamping device 50 is constructed so that its outer diameter is slightly smaller than the outer diameter of the flange section 30 of the stud 26. Thus, the arms 40 are expanded and, at first, clamp the flange section 30 of the stud 26 with their clamping surfaces 43 in place so that the stud 26 cannot fall downwards. Thereby "downwards" refers to the orientation shown in FIG. 3. When the flange section 30 is pushed through the slotted cylindrical front portion 41, the clamping surfaces 43 snap together and clamp the shank-clamping device 50 in place on its outer surface. Then, the shank section 28 of the stud 26 is held by the shank-clamping device 50 so that the stud 26 cannot slip out downwards. The stud 26 is now arranged in the ready position and can be handed over.

Figure 4:
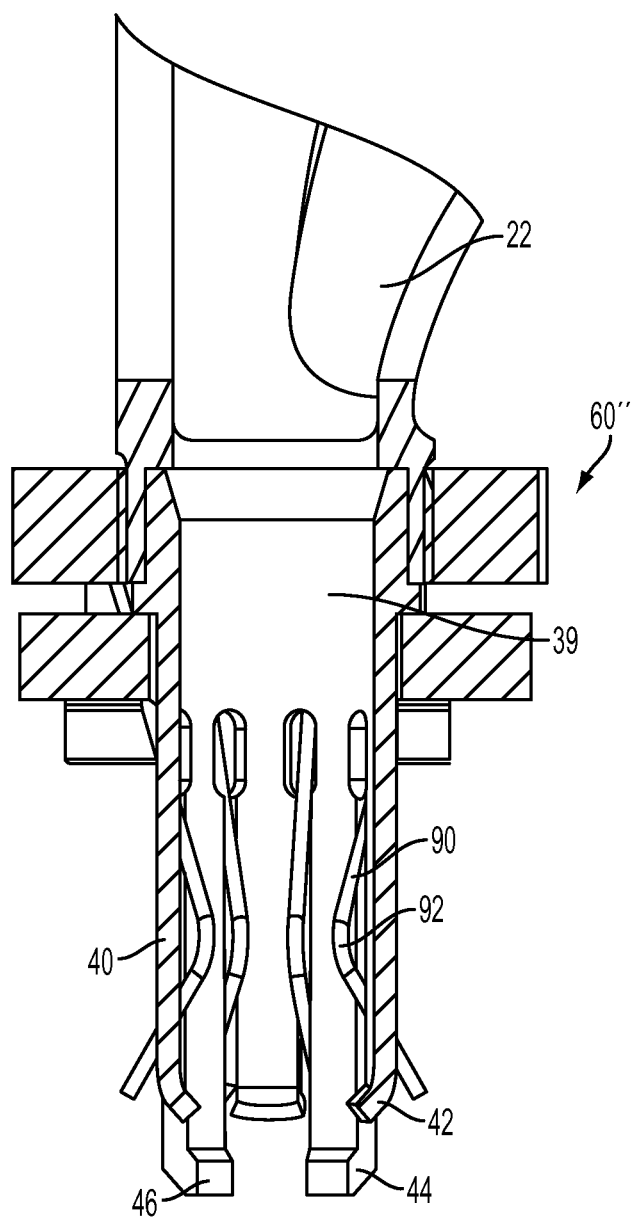
FIG. 4 shows a cross-sectional view of a holding device according to a third embodiment of the present invention.

In FIG. 4 a holding device 60" in an alternative third embodiment is shown. With regard to construction and functioning, the holding device 60" shown in FIG. 4 generally corresponds to the holding device of FIG. 5. The same elements are designated by the same designations. Only the differences are dealt with below. Furthermore, the joining head 14 in which the holding device 60" of FIG. 4 is to be used corresponds to the joining head 14 of FIG. 5. The general method sequence during the feeding and readying of studs and the subsequent joining sequence are otherwise identical, insofar as nothing else is mentioned.

Contrary to the holding device 60 shown in FIGS. 1 and 2, the holding device 60" shown in FIG. 4 has no securing-sleeve sections to hold the stud 26 in a securing position. The collet component 39 has a plurality of arms 42, 44 and is slotted in a longitudinal direction to provide a certain elasticity in a radial direction to the arms 42, 44. A support element 90 in the form of a wire is guided through each of the longitudinal slots between the arms 42, 44, wherein a bend section 92 is positioned within the collet component 39 in a resting position of the support elements 90 thereby reducing a free cross-section within the collet component 39.

If now a stud 26 is inserted into the collet component 39, a certain pressure on the stud 26 is sufficient so that a flange section 30 of the stud 26 can expand the support elements 90 and pass by the bend sections 92. When the flange section 30 has passed by the bend sections 92, the radially elastic support elements 90 move back into their initial position shown in FIG. 4. Now, the flange section 28 cannot move back any more, wherein the elasticity of the support elements 90 has to be chosen such that a stud 26 cannot expand the support elements 90 solely by its weight. The shank section 28 of the stud 26 is supported at the support elements 90 so that the shank section 28 does not abut the collet component 39 and can reliably be picked by the shank-clamping device 50.

In FIG. 4, the collet component is provided with clamping arms 40 and stop arms 44 like it is the case in the embodiment shown in FIGS. 1 and 2. Of course, it is conceivable that, as an alternative, the collet component 39 has a slotted cylindrical front portion like it is the case in the embodiment shown in FIG. 3.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A method of feeding a stud to a joining head operable to join the stud to a workpiece, the stud having an axially projecting shank and a radially projecting flange, and the joining head including a stud shank clamp, and wherein the method of feeding the stud comprises the steps of:

providing a stud holding device, the stud holding device comprising:

a collet component including a hollow tubular insertion section defining an insertion axis, and a clamping section, the clamping section axially below the insertion section and including a plurality of arms circumferentially distributed, axially extending, radially flexible at a free end, and operable to exert a radially inwardly directed clamping force for clamping the stud;

a securing device arranged on the insertion section and including a securing sleeve located coaxial with and radially inside the insertion section, the securing sleeve formed of a plurality of separate securing-sleeve sections and radially movable relative to one another; and a clearance space is defined between a bottom end of the securing-sleeve sections and a top end of the clamping section, and the clearance space is operable for releasably holding the flange of the stud in the securing position;

feeding the stud into the stud holding device to a first position wherein the flange is arranged above the free end of the plurality of arms and below the securing sleeve; and securing the stud in the first position by engaging the securing sleeve behind the flange.

2. The method of feeding a stud to a joining head according to claim 1 and further including the steps of:

moving the stud shank clamp toward the stud holding device;

engaging and centering the stud shank with the stud shank clamp;

pushing the stud flange downward into a ready position wherein the stud flange is located below the free end of the plurality of arms.

3. The method of feeding a stud to a joining head according to claim 1 wherein the step of providing a stud holding device the collet component plurality of arms includes clamping arms and stop arms, and the stop arms are axially longer than the clamping arms; and the method further includes the steps of:

moving the stud shank clamp toward the stud holding device;

engaging and centering the stud shank with the stud shank clamp;

pushing the stud flange downward into a second position wherein the stud flange is located below a free end of the clamping arms and above a free end of the stop arms.

* * * * *